United States Patent [19]

Kenmochi

[11] Patent Number: 4,988,274
[45] Date of Patent: Jan. 29, 1991

[54] METHOD AND APPARATUS FOR PRODUCING AN OPTICAL ELEMENT

[75] Inventor: Kazuei Kenmochi, Hirakata, Japan

[73] Assignee: Dresser Industries, Inc., Dallas, Tex.

[21] Appl. No.: 287,087

[22] Filed: Dec. 21, 1988

[30] Foreign Application Priority Data

Dec. 21, 1987 [JP] Japan ................. 62-323123

[51] Int. Cl.⁵ .............................. B29C 35/08
[52] U.S. Cl. .................. 425/174.4; 425/808
[58] Field of Search ............. 264/1.4, 22, 24; 219/121.73, 121.75, 121.65, 121.66, 121.6; 425/174, 174.4, 808

[56] References Cited

U.S. PATENT DOCUMENTS

| | | | |
|---|---|---|---|
| 3,242,806 | 3/1966 | Hine | 350/619 |
| 3,848,970 | 11/1974 | Goodell | 219/121.75 |
| 4,022,855 | 5/1977 | Hamblen | 264/347 |
| 4,166,088 | 8/1979 | Neete | 264/22 |
| 4,701,005 | 10/1987 | Noguchi | 350/3.7 |
| 4,728,469 | 3/1988 | Danner et al. | 264/1.4 |

FOREIGN PATENT DOCUMENTS

| | | |
|---|---|---|
| 0204378 | 12/1986 | European Pat. Off. . |
| 0226123 | 6/1987 | European Pat. Off. . |
| 2023719 | 1/1987 | Japan ................. 264/22 |

*Primary Examiner*—Willard Hoag

[57] ABSTRACT

A plastic optical element with good dimensional accuracy and no strain is produced by providing a mold having a cavity corresponding to a shape of the optical element and a feed passage which communicates with said cavity, at least one side of which mold for forming one surface of the optical element is made of a light transmitting material so that light can pass through said material into the mold cavity, charging a photocurable plastic material through said feed passage into said cavity, irradiating a central part of said cavity with light which initiates a photocuring reaction, and enlarging the light in the form of a ring until the lighted area reaches the periphery of the cavity so as to cure the entire photocurable plastic material. The light irradiation is carried out while a supplementary portion of the photocurable plastic material is maintained in said feed passage.

9 Claims, 4 Drawing Sheets

METHOD AND APPARATUS FOR PRODUCING AN OPTICAL ELEMENT

BACKGROUND OF THE INVENTION

1. Field of the Invention

The present invention relates to a method and an apparatus for producing a plastic optical element. More particularly, the present invention relates to a method and an apparatus for producing a plastic optical element involving polymerization.

2. Description of the Related Art

Plastic lenses are roughly classified into two kinds, one of which is made of thermoplastic polymers. As the thermoplastic polymers, polymethyl methacrylate (PMMA), polycarbonate, polystyrene, acrylonitrile-styrene copolymer and the like are known. These thermoplastic polymers may be molded by compression molding injection molding or injection-compression molding. In principle, for lens production, the polymer is heated and melted, poured and processed in a mold having a cavity correpsonding to the lens shape and compressed while the polymer is hot so as to compensate for a shrunk volume of the polymer which will be caused by cooling through volume elasticity. In the molding of thermoplastic polymers, since heat and pressure are necessary, large molds and apparatuses should be used, and molded articles tend to suffer from minute deformation.

Other lenses which can be produced through polymerization and processing of monomers for producing thermosetting polymers or thermoplastic polymers such as methyl methacrylate, diethylene glycol bis-allylcarbonate (namely, CR-39), glycol dimethacrylate, diethylene glycol dimethacrylate and the like. The polymers prepared from these monomers generally set at a relatively low temperature under low pressure so that they can be molded by a simple method which is referred to as casting or cast molding.

Figure 1:
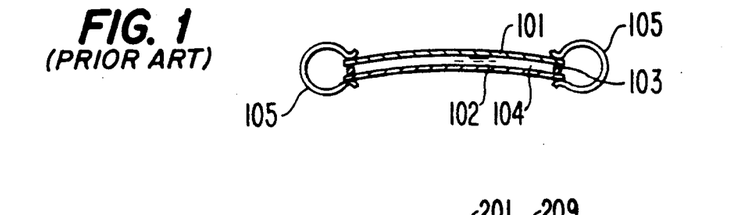
FIG. 1 illustrates one of the conventional cast molding methods for producing lenses for spectacles.

FIG. 1 illustrates one of the conventional cast molding methods for producing lenses for spectacles. A pair of glass plates 101, 102 are super posed through a gasket 103. A space formed by the the glass plates 101,102 and the gasket 103 is filled with a liquid monomer 104, and the circumferential edges of the glass plates are clamped with a clip 105. Then, the glass plates containing the monomer therein are kept standing. Since a small amount of a polymerization initiator is added to the monomer just before charging, a slight temperature increase initiates a polymerization reaction of the polymer in the space. After several to ten and several hours, the entire monomer is polymerized and forms a hard plastic lens. During polymerization, the material in the space shrinks by 10 to 20%, so that a thickness of the produced lens is decreased.

Although the cast molding can be employed to produce lenses having a relatively uniform and thin thickness such as spectacle lenses, it is said to be unsuitable for producing lenses for cameras such as VTR cameras. Further, since the cast molding takes a long time, it is not generally accepted for industrial production of plastic lenses.

Figure 2:
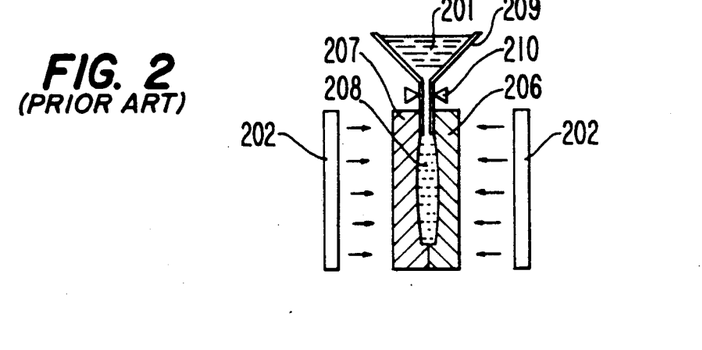
FIG. 2 illustrates a method for producing a plastic lens disclosed in Japanese Patent Kokai Publication No. 1980.

To overcome the above drawbacks of the cast molding, Japanese Patent Kokai Publication No. 132221/1980 discloses, as shown in FIG. 2, a method comprising curing a resin 208 in a cavity formed with glass molds 206,207 while irradiating the resin with UV light 202, charging an additional amount of resin 201 from a reservoir 209 through a stop cock 210 into the cavity to fill a gap formed through shrinkage of the cured polymer and removing the molded article after all the resin is cured. Since the UV curing is known as a high rate reaction process, it seems that the combination of this measure with the supplement of the resin would overcome the above drawbacks. However, this method has various problems. For example, since the resin loses its flowability before the entire reaction is completed, the shrunk volume is not sufficiently supplemented. Since the entire reaction proceeds at a high rate, compression stress due to the cure and shrinkage and tensile stress due to reaction against compression stress are quickly generated so that there is no or litter time for relieving the stresses, and the stresses exceed the breaking stress of the molded article, which results in insufficient dimensional accuracy and cracking. Thus, the molded articles are often broken before they are removed from the molds. This is particularly so when the lens has a large thickness.

SUMMARY OF THE INVENTION

One object of the present invention is to provide a method for producing a plastic optical element such as a lens with good accuracy at a high rate, even with respect to a lens having a relatively large difference of thickness.

Another object of the present invention is to provide an apparatus for practicing the process of the present invention.

According to the first aspect of the present invention, there is provided a method for producing a plastic optical element, which comprises supplying a mold having a cavity corresponding to a shape of the optical element and a feed passage which communicates with said cavity, at least one side of which mold for forming one surface of the optical element is made of a light transmitting material so that light can passes through said material into the mold cavity, charging a photocurable plastic material through said feed passage into said cavity, irradiating a central part of said cavity with light which initiates a photocuring reaction and enlarging the light in the form of a ring until the lighted area reaches the periphery of the cavity so as to cure the entire photocurable plastic material, the light irradiation being carried out while maintaining a supplementary portion of the photocurable plastic material in said feed passage.

According to the second aspect of the present invention, there is provided a first embodiment of an apparatus for producing a plastic optical element, which comprises a mold having a cavity corresponding to a shape of the optical element and a feed passage which communicates with said cavity, at least one side of which mold for forming one surface of the optical element is made of a light transmitting material, a ring-shaped light source for emitting light which initiates a photocuring reaction and a variable power lens, wherein said mold, said light source and said variable power lens are so arranged that the center of the ring-shaped light emitted from said light source substantially aligns with the center of the cavity when the light is irradiated on said cavity through said variable power lens.

According to the third aspect of the present invention, there is provided a second embodiment of an apparatus for producing a plastic optical element, which comprises a mold having a cavity corresponding to a shape of the optical element and a feed passage which communicates with said cavity, at least one side of which mold for forming one surface of the optical element is made of a light transmitting material, a ring-shaped light source for emitting light which initiates a photocuring reaction and from which light is emitted in a direction towards the axes of the ring-shaped light source and a conical mirror and a lens, wherein said mold, said light source, said mirror and said lens are so arranged that the center of the ring-shaped light, which is reflected on the surface of said mirror, passes through said lens and then irradiates said cavity, is substantially aligned with the center of the cavity.

According to a fourth aspect of the present invention, there is provided a third embodiment of an apparatus of the present invention, which comprises a mold having a cavity corresponding to a shape of the optical element and a feed passage which communicates with said cavity, at least one side of which mold for forming one surface of the optical element is made of a light transmitting material, a laser system for generating a laser beam which has ring-shaped intensity distribution and initiates a photocuring reaction and a variable power lens, wherein said mold, said laser system and said variable power lens are so arranged that the center of the ring-shaped light is substantially aligned with the center of the cavity when the laser is irradiated on said cavity through said variable power lens.

According to a fifth aspect of the present invention, there is provided a fourth embodiment of an apparatus of the present invention, which comprises a mold having a cavity corresponding to a shape of the optical element and a feed passage which communicates with said cavity, at least one side of which mold for forming one surface of the optical element is made of a light transmitting material, a light source for emitting light which has a strong directivity and initiates a photocuring reaction and a means for causing said light beam to move along a ring-shaped path on said cavity.

In the method of the present invention, the photocurable plastic material contained in the mold cavity is first cured at the center part with light which is irradiated at the center of the cavity. In this step, since the uncured liquid material is still present around the center part of the plastic material which is being cured, the shrunk volume of the material is supplemented with said uncured liquid material. Then, the liquid plastic material is fed into the cavity through the feed passage in an amount corresponding to the amount which is used for supplementing the shrunk volume. After the reaction in the center part is completed, the irradiated area is expanded in a ring-shaped and in turn, the reaction area is enlarged in a ring form. Around the ring-shaped area in which the plastic material is being cured, there is always the uncured liquid material. Therefore, the shrunk volume is supplemented with the surrounding liquid material. In addition, since no light is irradiated inside the ring-shaped area, excessive reaction which causes strain due to curing is prevented. Finally, the ring-shaped light is enlarged to the outermost periphery of the cavity to cure the entire volume of the optical element.

With the first embodiment of the apparatus of the present invention, the ring-shaped light which initiates the photocuring reaction is passed through the variable power lens and the light transmitting material and led into the mold cavity. Through adjustment of the variable power lens, the ring-shaped light can be focused onto the central part or expanded towards the peripheral part of the cavity. Thus, the photocurable plastic material in the mold cavity can be cured from the central part toward the peripheral part step by step, and the shrunk volume can be supplemented with the uncured plastic material entering the mold cavity through the feed passage.

With the second embodiment of the apparatus of the present invention, the ring-shaped light is reflected on the the conical mirror, passed through the lens and then led into the mold cavity through the light transmitting material. Through a change of the relative position between the ring-shaped light source and the conical mirror in the direction along the axis which is common to the light source and the mirror, a diameter of the light ring is changed so that the, ring-shaped light is focused onto the central part or expanded towards the peripheral part of the cavity. Thus, the photocurable plastic material in the mold cavity can be cured from the central part toward the peripheral part step by step, and the shrunk volume can be supplemented with the uncured plastic material entering the mold cavity through the feed passage.

With the third embodiment of the apparatus of the present invention, the laser beam having, inherently a ring-shaped intensity distribution is passed through the variable power lens and the light transmitting material and- then led into the mold cavity. Through an adjustment of the variable power lens, the laser beam can be focused onto the central part or expanded towards the peripheral part of the cavity. Thus, the photocurable plastic material in the mold cavity can be cured from the central part toward the peripheral part step by step, and the shrunk volume can be supplemented with the uncured plastic material entering the mold cavity through the feed passage.

With the fourth embodiment of the apparatus of the present invention, the light beam which has the strong directivity and initiates the photocuring reaction irradiates the mold cavity through the light transmitting material. Since the light beam is caused to move along a ring-shaped path in the cavity, if the light beam is formed into a ring at a rate faster than the cure rate of the plastic material, it achieves the same effect as the ring-shaped laser beam or light. Thus, when the radius of the light beam moving along said path is increased from the center to the periphery of the cavity, the photocurable plastic material in the mold cavity is cured from the central part toward the peripheral part, and the shrunk volume can be supplemented with the uncured plastic material entering the mold cavity through the feed passage.

DETAILED DESCRIPTION OF THE PREFERRED EMBODIMENTS

The present invention will be described with reference to the accompanying drawings.

Figure 3:
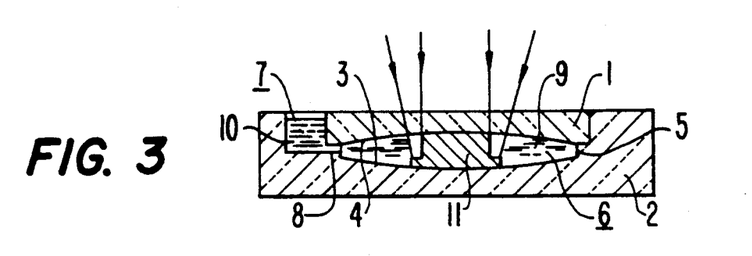
FIG. 3 is a cross-sectional view of a mold for use in the production of a plastic lens according to the present invention.

FIG. 3 is a cross-sectional view of a mold for use in the production of a plastic lens according to the present invention. On inner surfaces of an upper mold 1 made of quartz glass and a lower mold 2, lens surfaces 3,4 of the molds are so formed that their curvatures correspond to those of surfaces of a lens to be produced. The upper mold 1 is engaged with the lower mold 2 in which a step 5 is formed for establishing the lens thickness. The lens surfaces 3,4 and the step 5 define a cavity 6 which corresponds to the outer shape of the lens. In the lower mold 2, a feed passage 7, which communicates with the cavity 6, is formed through a recessed portion 8 formed in a part of the step 5.

In FIG. 3, a photocurable plastic material 9 is already charged in the cavity 6, and an additional amount 10 of the plastic material is contained in the feed passage 7.

The "photocurable plastic material" herein used is intended to mean a mixture of a photopolymerizable monomer and a photopolymerization initiator, which mixture is in a liquid state in a temperature range in which the polimerization does not proceed quickly. Preferably, the photopolymerizable monomer is an ethylenically unsaturated compound or a mixture of two or more ethylenically unsaturated compounds. Examples of the ethylenically unsaturated compounds are acrylates (e.g. 2-hydroxyethyl acrylate, ethylene glycol diacrylate, phenoxyethyl acrylate, phenoxydiethylene glycol acrylate, 2-hydroxy-3-phenoxypropyl acrylate, tetrahydrofurfuryl acrylate, dicyclopentenyloxyethyl acrylate, 1,4-butanediol diacrylate, neopentyl glycol diacrylate, triethylene glycol diacrylate, etc.), methacrylates (e.g. 2-hydroxyethyl methacrylate, glycidyl methacrylate, bisphenol-A dimethacrylate, cyclohexyl methacrylate, dicyclopentenyl methacrylate, monobromodichloropentenyl methacrylate, 2,2-bis(4-methacryloxy-3,5-dibromophenyl)propane, bis(oxy-methyl)-tricyclo[5.2.1.0$^{2,6}$]decane dimethacrylate, thiobisphenol dimethacrylate, etc.) and aromatic vinyl compounds (e.g. styrene, divinylbenzene, etc.). They may be used independently or as a mixture thereof. Examples of the photopolymerization initiators are benzoin methyl ether, benzoin ethyl ether, benzyl dimethyl ketal, 1-hydroxycyclohexyl phenyl ketone, 1-hydroxy-2-methyl-1-phenylpropanone, diethoxyacetophenone, trichloroacetophenone and the like. They may be used independently or as a mixture thereof.

In the hatched part 11 in FIG. 3, the material 9 has been cured, and in a part irradiated by the ring-shaped light indicated by arrows the material 9 is being cured.

Figure 4:
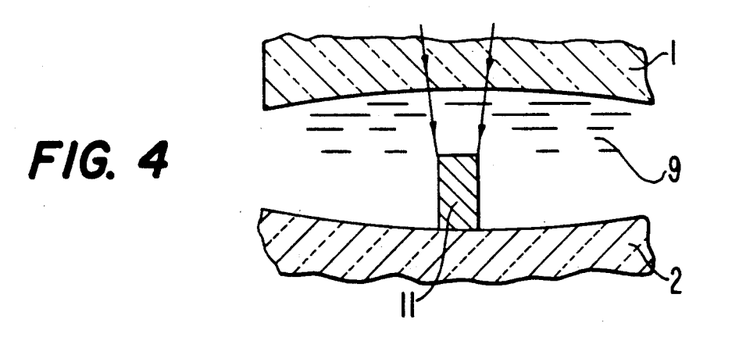
FIG. 4 is an enlarged cross-sectional view of a part of the mold of FIG. 1 in an initial photopolymerization

FIG. 4 is an enlarged cross-sectional view of a part of the mold of FIG. 3 in an initial photopolymerization stage. The light focused in a spot is irradiated at the center of the cavity. In a direction of thickness of the lens, substantially the middle portion is in the highest energy state since the light beams indicated by the arrows are most concentrated at the middle portion. Therefore, at that portion, the polymerization proceeds most vigorously. By moving up and down a position at which the light beams are most concentrated, the photopolymerization reaction is controlled in the direction of thickness.

Figure 5:
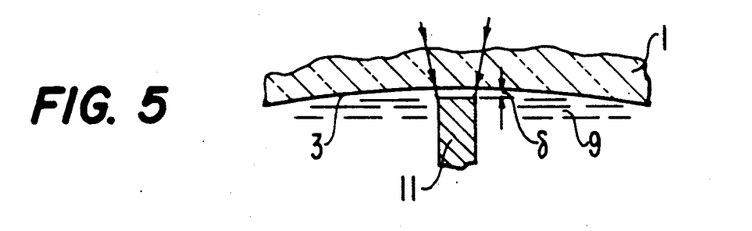
FIG. 5 is a partial view of of the mold subsequent to the initial photopolymerization stage of FIG. 4.

FIG. 5 is a partial view of FIG. 4, and shows a state of polymerization a short period of time after the state shown in FIG. 4. That is, the position at which the light beams are most concentrated has shifted upwardly to a location near the lens surface 3 of the upper mold 1. When the material 9 near the lens surface 3 is cured, a narrow gap δ is formed between the already cured material 11 and the lens surface 3. As soon as the gap is formed, a portion of the uncured material 9 flows into said gap through a capillary phenomenon and is cured. Thus, no strain due to shrinkage of the material caused by curing is generated so that the shape of the mold is accurately transferred.

Figure 6:
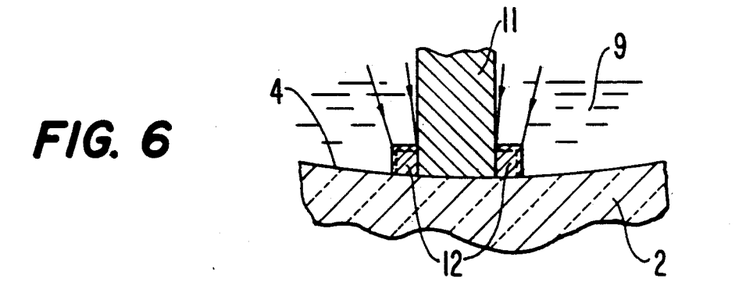
FIG. 6 is another partial view of the mold but subsequent to the stage of FIG. 5.

FIG. 6 is another partial view of FIG. 4, and shows a state of polymerization a period of time after the state shown in FIG. 5. At this stage, the ring-shaped light is irradiated around the already cured part 11. At a part 12 which is newly cured, its periphery tends to shrink to a size shown by dotted lines. But, the shrunk volume is easily supplemented with the uncured material 9.

In the above description, the plastic material is cured from the lower mold surface to the upper mold surface according to the lighting pattern at the central part, and then a ring-shaped part surrounding the central part is cured from the lower mold surface to the upper mold surface. But, the cured part does not necessarily have such a clear outline as in the drawings, since the curing rate has a gentle slope because of a distribution of light intensity, light scattering in the liquid material, micro-Brownian motion of optically decomposed radicals in the liquid material and the like. The reaction in the vertical direction often proceeds simultaneously at any part in this direction unless the light has a very large concentration angle. In such cases, the shrunk volume can be supplemented with the uncured plastic material according to the present invention.

As the light source, one generating light having a wavelength of 300 to 450 nanometers such as a high pressure mercury lamp, a metal halide lamp, a He—Cd laser and an Ar ion laser are preferred.

Figure 7:
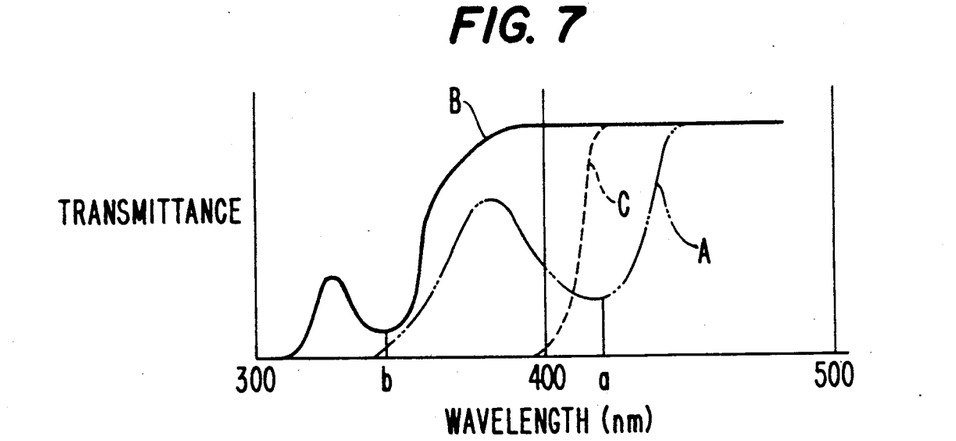
FIG. 7 is a graph showing the transmittances the plastic materials and the photopolymerization initiators.

In general, the plastic material has poor transmission in a wavelength range shorter than 400 nanometers as shown by the curve C in the graph of FIG. 7. On the contrary, some of the photopolymerization initiators have a light absorption and decomposition peak at a wavelength longer than 400 nanometers (for example, the peak "a" in the curve A of FIG. 7) and some of the photopolymerization initiators have said peak at a wavelength shorter than 400 nanometers (for example, the peak "b" in the curve B of FIG. 7). The above-described embodiment of the present invention is suitable for a combination of plastic material having the transmittance of the curve C and a photopolymerization initiator having the transmittance of the curve B.

Figure 8:
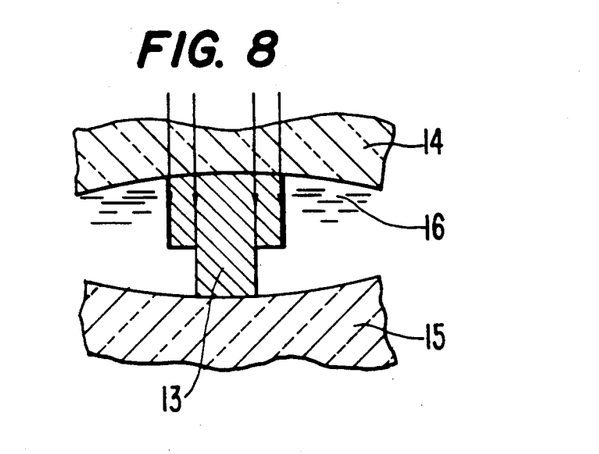
FIG. 8 shows a curing pattern of the plastic material in the mold.

Since most of the photopolymerization initiators have the light absorption peak at a wavelength shorter than 400 nanometers, the illuminated light is absorbed by the plastic material so that the illumination effect decreases as the thickness of the plastic material layer increases. In such a case, the curing proceeds as shown in FIG. 8 which schematically shows a curing pattern. Through the already cured part 13, the light is illuminated as indicated by arrows, and the curing reaction proceeds in the direction in which the light is illuminated. In FIG. 8, reference numeral designates the upper mold, 15 the lower mold and 16 the uncured plastic material.

Figure 9:
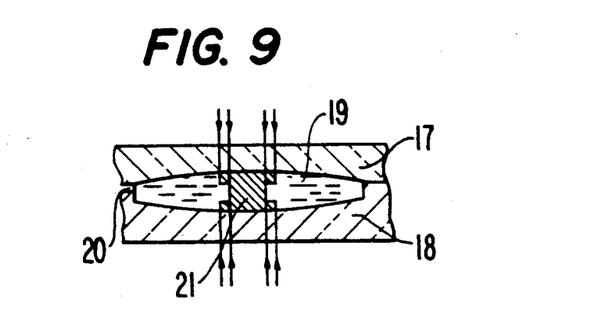
FIG. 9 shows other irradiation pattern of the plastic material in the mold.

In this embodiment, illumination from both sides of the molds as shown in FIG. 9 is effective in view of the curing rate and the prevention of curing strain. In FIG. 9, the arrows indicate the light illuminated from both sides, reference numeral 17 designates the upper mold, 18 the lower mold, 19 the uncured plastic material, 20 the recessed portion communicating with the feed passage, and 21 the already cured part of the plastic material.

Figure 10:
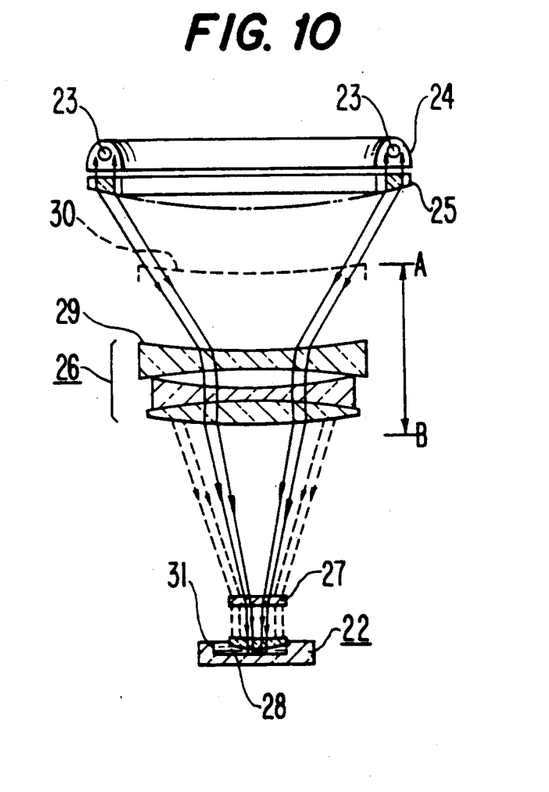
FIG. 10 is a partial cross-sectional view of another embodiment of the apparatus of the present invention.

FIG. 10 schematically shows one embodiment of the apparatus for producing the plastic lens according to the present invention. A mold 22 is used for producing a concave lens and has substantially the same structure as the mold of FIG. 3. Around a ring-shaped high pressure mercury lamp 23 is disposed a ring-shaped reflector 24 having a parabolic cross section. Below the open side of the reflector, a ring-shaped lens 25 is provided. Further, below the lens 25 are vertically movable variable power lenses 26 and a fixed lens 27 which focus the ring-shaped light on the mold 22. The centers of the lamp 23, the reflector 24 and the lenses 25, 26 and 27 are substantially aligned. The lens 25 has a doughnut shape which corresponds to a peripheral portion of a convex lens. In FIG. 10, an imaginary central portion of the convex lens is indicated with an alternate long and two short dashes line. Thus, the lens 25 substantially acts as a convex lens and can focus a parallel light beam having a ring shape, which is generated with the high pressure mercury lamp 23 and the reflector 24, toward the optical axis. The variable power lenses 26 modify a focus angle of the light which has been focused with the lens 25 so that, after passing through the lens 27, the light forms an image in the cavity 28 of the mold 22. In addition, the variable power lenses 26 can change a radius of the ring-shaped pattern of the irradiated light by moving the lenses 26 up and down relative to the lens 25. That is, in FIG. 10, the lenses 26 are located at an intermediate position. When the variable power lenses 26 are shifted upwardly to the upper limit position A, the upper surface 29 of the lenses 26 reaches the dashed line 30, so that the light beam indicated with the dashed lines illuminates the outermost part of the cavity 28 of the mold 22. When, the variable power lenses 26 are lowered to the lower limit position B, the light beam is narrowed to form a point-like light. Thus, at the start of the molding process, the variable power lenses 26 are positioned at the lower limit position B, and then the lenses 26 are shifted upwardly as the photopolymerization proceeds to enlarge the diameter of the ring-shaped light pattern, whereby the plastic material in the mold cavity can be thoroughly cured from the center to the periphery of the mold. The lens 27 can focus the light in the cavity through vertical movement thereof. When the cavity 28 has a large depth, the lens 27 is preferably vibrated vertically. In FIG. 10, reference numeral 31 designates the feed passage.

Figure 11:
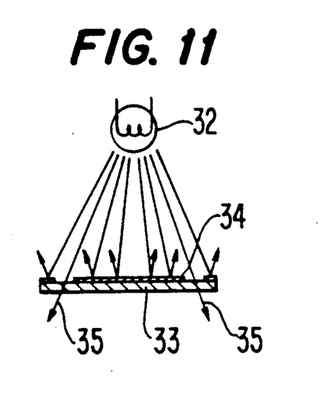
FIG. 11 is a cross-sectional view of one of the light sources to be used in the apparatus of the present invention.

FIG. 11 illustrates another embodiment of the light source to be used in the apparatus for producing the plastic lens according to the present invention, in which a small mercury lamp 32, which is similar to a point light source, is employed instead of the ring-shaped high pressure mercury lamp 23 in FIG. 10. Below the mercury lamp 32 is a quartz glass plate 33 on which a chromium metal layer 34 is deposited so as to form a ring-shaped transparent part through which the light passes. The light passing the ring-shaped transparent part on the quartz glass plate 33 forms a ring-shaped light beam, which can be shrunk or enlarged and then irradiated on the plastic material in the mold in the same manner as in FIG. 10. Such a light source is economical and is easily set up.

Figure 12:
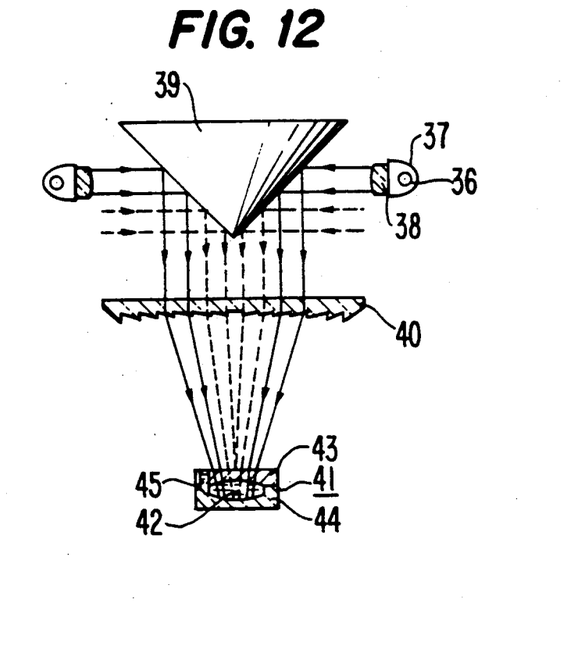
FIGS. 12, 13, 14 and 15 are cross-sectional views of various further embodiments of the apparatus of the present invention.

FIG. 12 shows a further embodiment of the apparatus for producing the plastic lens. The light source consists of a ring-shaped high pressure mercury lamp 36, a ring-shaped mirror 37 and a ring-shaped lens 38 and generates substantially parallel light beams in the direction towards the center of the ring as shown by the solid lines. A conical mirror 39 has an apex angle of about 90° and is positioned concentrically with the ring-shaped lamp 36. The light beams are reflected on the surface of the conical mirror 36 in the downward direction. Then, through a Fresnel lens 40 which acts as a convex lens, the light is focused in a cavity 42 of a mold 41. When the cavity has a large depth, the Fresnel lens 42 is moved up and down to shift the focal point in the depth-wise direction. In FIG. 12, reference numerals 43, 44 and 45 designate the upper mold, the lower mold and the feed passage, respectively. The light source and the conical mirror can be relatively moved in the axial direction. When the light source is lowered, the light beams pass along the broken lines in FIG. 12. That is, when the light source moves towards the mold, the light beams are reflected near the apex of the conical mirror 39 so that the radius of the ring-shaped light is decreased. Thus, at the start of the molding process, the relative position of the light source with the mirror 39 is so adjusted that the light beams are reflected on the mirror surface near the apex of the conical mirror 39 and, as the photopolymerization proceeds, the light source and/or the conical mirror are relatively moved so that the light beams are reflected on the a portion of mirror surface spaced from the apex of the conical mirror 39 so as to increase the radius of the ring-shape light irradiated on the plastic material in the mold cavity.

In this apparatus of FIG. 12, since no variable power lens is required, the apparatus can be made simple and compact.

Figure 13:
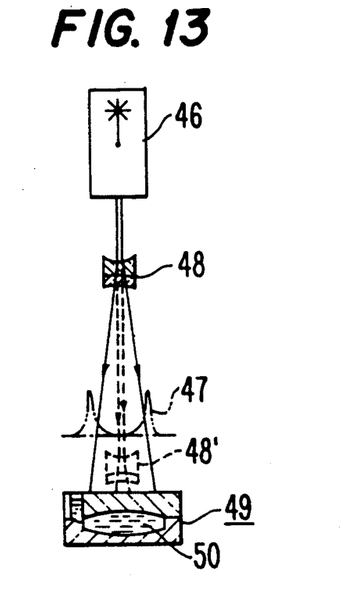

FIG. 13 shows a yet another embodiment of the apparatus for producing the plastic lens according to the present invention.

A He—Cd laser system 46 can generate a laser beam having an intensity distribution as shown by the alternate long and two short dashes line 47. The relative positions among the laser system 46, a lens 48 and a mold 49 are adjusted so that the circular peak of the laser beam intensity distribution is enlarged at the irradiated position in the mold cavity through the function of the lens 48 which enlarges the laser beam. To this end, the lens 48 is vertically movable. When the lens 48 is lowered to the position shown by the dashed line 48', the laser beam is focused at a central point in the cavity 50. Thus, it is possible to irradiate the plastic material in the cavity 50 while enlarging the ring-shaped laser from the center to the periphery of the mold.

Figure 14:
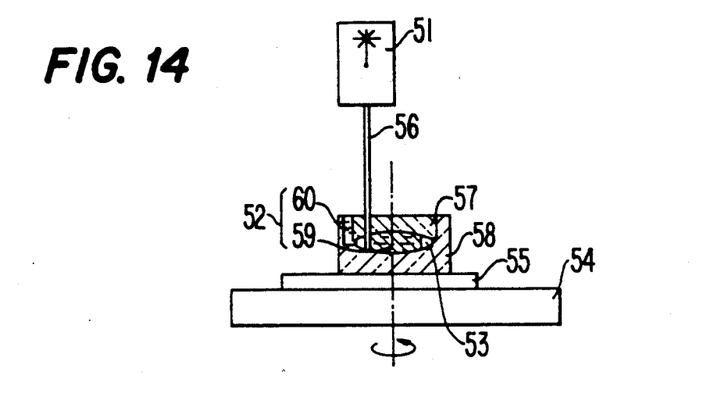

FIG. 14 shows yet a further embodiment of the apparatus for producing the plastic lens according to the present invention. A He—Cd laser system 51 is provided so that a laser beam 56 irradiates a cavity 53 of a mold 52. The mold 52 is fixed on the X-Y table 55 which is freely moved in the horizontal directions with a control apparatus (not shown) relative to table 54. In this embodiment, the table 54 is so moved that the cavity is rotated around its center, whereby the laser beam is circularly irradiated on the cavity. When the cavity is rotated quickly enough in comparison to the photopolymerization rate, the laser beam seems to be irradiated as if it were generated by a ring-shaped light source. As the distance between the irradiated position and the center of the cavity is increased by movement of the X-Y table 55, the same effect is achieved as in the case where the diameter of the ring-shaped light is increased. In FIG. 14, reference numerals 57 and 58 designate the upper and lower molds, respectively, the cross-hatched part 59 the cured material, and 60 the feed passage.

Figure 15:
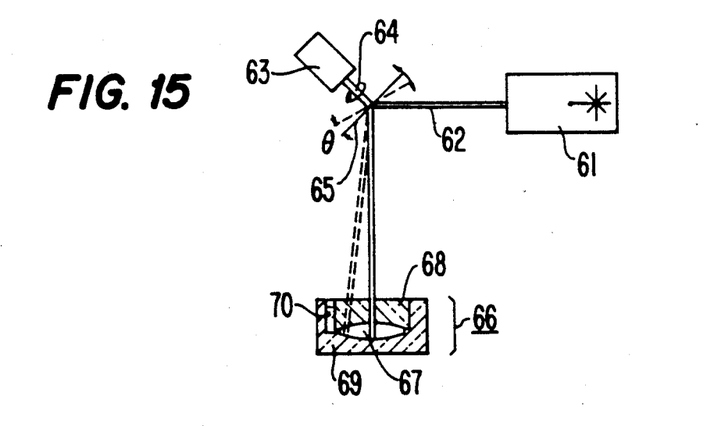

FIG. 15 illustrates a further embodiment of the apparatus for producing the plastic lens according to the present invention. A laser beam 62 generated by a He—Cd laser system 61 is reflected on a surface of a mirror 65. A mounting angle Θ of the mirror 65 on a rotating axis 64 can be adjusted. By enlarging the mounting angle Θ from the angle at which the laser beam is irradiated at the center of the cavity 67 of the mold 66, the irradiated position shifts from the center to the periphery of the mold cavity. When the mirror is rotated around the rotating axis quickly enough in comparison with the photopolymerization rate, a substantially ring-shaped light is formed on the cavity and its diameter is increased from the center to the periphery of the cavity. In FIG. 15, reference numerals 68, 69 and 70 designate the upper mold, the lower mold and the feed passage, respectively.

When the laser beam is used as in the embodiments of FIGS. 14 and 15, the reaction area is precisely controlled since the laser beam has strong directivity. In combination with means for causing the laser beam to move along a ring-shaped path on the cavity, such as the table 54 in FIG. 14 and the mirror 65 in FIG. 15, the radius of the irradiated area can be increased step by step by means of the X-Y table 55 in FIG. 14 and the enlargement of the angle Θ of the mirror in FIG. 15, whereby the plastic lens with less strain can be produced. Further, in the embodiments of FIGS. 14 and 15, no condenser lens is used.

According to the present invention, since the plastic lens is produced under conditions under which the strain in the mold is suppressed and the reaction proceeds as quickly as possible, the curing of the plastic material is not always completed in view of the degree of polymerization. In such case, the plastic lens is gradually heated to complete the curing through thermal polymerization, or it is further irradiated with light to complete the curing so as to accurately improve the characteristics of the lens.

What is claims is:

1. An apparatus for producing a plastic optical element, which apparatus comprises:
    a mold having spaced-apart sides between which a cavity is defined in a shape corresponding to the shape of an optical element to be produced, and a feed passage open to said cavity at a portion of the periphery of said cavity, at least one of said sides being made of a light-transmittable material;
    light source means for emitting a ring-like light capable of causing a photocuring reaction to occur in liquid material from which the optical element is to be formed in said cavity by the apparatus;
    a variable power lens disposed in an optical path between said light source means and said mold for focussing the ring-like light emitted by said light source means along said optical path such that the center of the ring-like light is substantially aligned with the center of said cavity, the distance between said variable power lens and said mold establishing the diameter of the ring-like light as taken substantially through the center of said cavity; and
    means for changing the distance between said variable power lens and said mold by an amount sufficient to allow the ring-like light emitted by said light source means to be focussed at substantially the center of said cavity and to have said diameter thereof be continuously increased from the center of said cavity as said distance is changed until the ring-like light is irradiated at the periphery of said cavity.

2. The apparatus as claimed in claim 1, wherein said light source means is a laser system including a laser, which system generates a laser beam having a ring-shaped intensity distribution.

3. The apparatus as claimed in claim 1, wherein said light source means generates a ring-shaped light.

4. The apparatus as claimed in claim 3, wherein said light source means includes a ring-shaped high pressure mercury lamp, a ring-shaped reflector disposed around said lamp for reflecting light emitted by said lamp along the optical path, and a ring-shaped lens disposed in the optical path between said reflector and said variable power lens.

5. The apparatus as claimed in claim 3, wherein said light source means includes a mercury lamp, a plate of material transmittable to light emitted by said lamp and disposed adjacent said lamp, said plate having a layer of material thereon that is not transmittable to light emitted by said lamp, said layer extending over an area of said plate except at a ring-shaped portion.

6. An apparatus for producing a plastic optical element, which apparatus comprises:
    a mold having spaced apart sides between which a cavity is defined in a shape corresponding to the shape of an optical element to be produced, and a feed passage open to said cavity at a portion of the periphery of said cavity, at least one of said sides being made of a light-transmittable material;
    a ring-shaped light source means for emitting light radially thereof, the light capable of causing a photocuring reaction to occur in liquid material from which the optical element is to be formed in said cavity by the apparatus;
    a mirror having a conical surface spaced radially of and confronting said light source means for reflecting the light along an optical path between said ring-shaped light source means and said mold, said surface having an apex and defining a central axis extending through said apex and about which axis said surface is centered;
    a lens disposed between said mirror and said mold in said optical path for focussing the light reflected by said mirror such that the light travels to said mold with the center thereof substantially aligned with the center of said cavity; and
    means for moving said mirror and said light source means relative to one another along said axis between a position at which said light source means confronts said mirror at the apex thereof so that light reflected by said mirror at the apex is focussed at substantially the center of said cavity and a position at which said light source means confronts said mirror at a location on said surface thereof from which location light reflected is irradiated in a ring shape on the periphery of said cavity.

7. An apparatus for producing a plastic optical element, which apparatus comprises:

a mold having spaced apart sides between which a cavity is defined in a shape corresponding to the shape of an optical element to be produced, and a feed passage open to said cavity at a portion of the periphery of said cavity, at least one of said sides being made of a light-transmittable material;

light source means for emitting light having a high degree of directivity and capable of causing a photocuring reaction to occur in liquid material from which the optical element is to be formed in said cavity by the apparatus;

means for causing the light to move along a ring-shaped path on the cavity of said mold, the ring-shaped path being substantially centered at the center of said cavity; and means for increasing the radius of said ring-shaped path along which the light is caused to move in a step by step manner from a value at which the light having a high degree of directivity is entirely irradiated substantially at the center of said cavity to a value at which the light is irradiated along the periphery of said cavity.

8. The apparatus as claimed in claim 7, wherein said means for causing comprises a table rotatably mounted in the apparatus for rotating about an axis of rotation, said mold is mounted to said table, the light is irradiated on the cavity in the apparatus while traveling parallel to said axis of rotation, and said means for increasing the radius comprises a X-Y table for moving said mold and said light source means relative to one another such that the light irradiated on the cavity of said mold moves in a direction perpendicular to said axis of rotation.

9. The apparatus as claimed in claim 7, wherein said means for causing comprises a mirror disposed in the apparatus so as to reflect light emitted from said light source means along an optical path toward said mold, and a motor operatively connected to said mirror for rotating said mirror about an axis of rotation, and said means for increasing comprises means for changing an angle defined between said mirror and said axis of rotation.

* * * * *

UNITED STATES PATENT AND TRADEMARK OFFICE
CERTIFICATE OF CORRECTION

PATENT NO. : 4,988,274

DATED : January 29, 1991

INVENTOR(S) : Kazuei Kenmochi

It is certified that error appears in the above-identified patent and that said Letters Patent is hereby corrected as shown below:

On the title page, in item [73], the Assignee information has been corrected from "Dresser Industries, Inc., Dallas, Tex." to --Matsushita Electric Industrial Co., Ltd., Osaka, Japan--.

Signed and Sealed this

Twenty-eighth Day of July, 1992

Attest:

DOUGLAS B. COMER

*Attesting Officer*   Acting Commissioner of Patents and Trademarks